(12) United States Patent
Tsuboi et al.

(10) Patent No.: US 7,800,702 B2
(45) Date of Patent: Sep. 21, 2010

(54) LIQUID CRYSTAL DISPLAY DEVICE, LIQUID CRYSTAL CELL, TRANSPARENT SUBSTRATE, AND METHOD OF MANUFACTURING LIQUID CRYSTAL CELL

(75) Inventors: Kenji Tsuboi, Shiga-ken (JP); Tsutomu Morimoto, Shiga-ken (JP)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 10/905,448

(22) Filed: Jan. 5, 2005

(65) Prior Publication Data
US 2005/0174525 A1 Aug. 11, 2005

(30) Foreign Application Priority Data
Jan. 6, 2004 (JP) .............................. 2004-000830

(51) Int. Cl.
G02F 1/13 (2006.01)
G02F 1/1333 (2006.01)
(52) U.S. Cl. .......................................... 349/1; 349/158
(58) Field of Classification Search ................... 349/1, 349/158, 160
See application file for complete search history.

(56) References Cited

U.S. PATENT DOCUMENTS

| | | | | |
|---|---|---|---|---|
| 5,537,235 A | * | 7/1996 | Ishihara et al. | 349/155 |
| 6,219,122 B1 | * | 4/2001 | Uchida et al. | 349/117 |
| 6,427,017 B1 | * | 7/2002 | Toki | 381/190 |
| 2006/0227981 A1 | * | 10/2006 | Miyata | 381/124 |

FOREIGN PATENT DOCUMENTS

| | | |
|---|---|---|
| JP | PUPA 04-368910 | 12/1992 |
| JP | PUPA 05-158024 | 6/1993 |
| JP | PUPA 05-249423 | 9/1993 |
| JP | PUPA 08-278474 | 10/1996 |
| JP | PUPA 10-111659 | 4/1998 |
| JP | PUPA 2001-33827 | 2/2001 |

OTHER PUBLICATIONS

Copending U.S. Appl. No. 10/908,758, filed May 25, 2005 entitled "High Performance Integrated MLC Cooling device for High Power Density ICs and Method of Manufacturing"IBM Docket # FIS920040287US1.

* cited by examiner

Primary Examiner—David Nelms
Assistant Examiner—Nathanael R Briggs
(74) Attorney, Agent, or Firm—James J. Cioffi; Joseph Petrokaitis (57) ABSTRACT

To provide a liquid crystal display device capable of outputting a sound of a sufficiently large volume by use of a liquid crystal cell which displays an image. A liquid crystal display device includes a thin front glass substrate having an outer surface in which a rib is formed on a peripheral portion, a back glass substrate arranged with a predetermined gap from an inner surface of the front glass substrate, in which liquid crystal is sealed in the gap, and a sound source element provided in contact with the front glass substrate.

5 Claims, 10 Drawing Sheets

| FREQUENCY OF STANDARD SOUND | INTENSITY OF VIBRATION PROPAGATION WHEN INTENSITY WITHOUT GLASS IS 100 (ATTENUATION FACTOR %) | | | | |
|---|---|---|---|---|---|
| | NO GLASS | THICKNESS OF 0.7mm | THICKNESS OF 0.4 mm | THICKNESS OF 0.1 mm | THICKNESS OF 0.1 MM (WITH RIB) |
| 1kHz | 100 | 65.1(34.9) | 68.1(31.9) | 77.4(22.6) | 82.3(17.7) |
| 5kHz | 100 | 65.1(34.9) | 68.0(32.0) | 81.4(18.6) | 81.4(18.6) |

LIQUID CRYSTAL DISPLAY DEVICE, LIQUID CRYSTAL CELL, TRANSPARENT SUBSTRATE, AND METHOD OF MANUFACTURING LIQUID CRYSTAL CELL

BACKGROUND OF THE INVENTION

The present invention relates to a liquid crystal display device of a liquid crystal television set, a liquid crystal display for a cellular phone, and the like, which performs a display by modulating a linear polarization state, and more specifically, to a liquid crystal display device capable of outputting an audio from a screen itself.

In recent years, liquid crystal display device technology, and particularly, liquid crystal display device technology using color display elements has significantly progressed. In the liquid crystal display device, downsizing/thinning, weight reduction, and further, lower power consumption, can be achieved. Accordingly, demand for liquid crystal display devices has rapidly expanded. Such a liquid crystal display device has a configuration in which an element (liquid crystal cell) formed by sandwiching a liquid crystal layer between a pair of glass substrates is provided, and polarizing plates are attached onto a light incident side and light emitting side of the liquid crystal cell. Then, in the liquid crystal display device, typically a transmissive liquid crystal display device, a liquid crystal cell is illuminated from behind by a backlight, and a polarization state of a linear polarization incident onto the liquid crystal cell is modulated by a liquid crystal layer, and thus a display is performed.

The liquid crystal display device has also been utilized actively for a portable information terminal such as a cellular phone and a personal digital assistant (PDA), a car navigation device, and the like, by making use of such characteristics thereof that it is possible to achieve the downsizing/thinning, the weight reduction, and the lower power consumption. In such a portable information device, it is also necessary to output audio information in addition to image information, and accordingly, the information device mounts a speaker thereon. In order to achieve further downsizing/thinning and weight reduction of such an information device, technologies which enable an audio output without using a conventional speaker have been proposed.

For example, there is a technology regarding an electrostatic transparent speaker composed of a transparent vibration plate on which a transparent electrode film is formed; a transparent fixing plate on which a transparent electrode film is formed, the transparent fixing plate being opposite to the transparent vibration plate; and an insulating spacer frame which is provided between the transparent vibration plate and the transparent fixing plate and forms a closed space together with the transparent vibration plate and the transparent fixing plate. The electrostatic transparent speaker is used by being attached onto a front of a display or the like such that the other side of the speaker can be seen from outside through transmission regions of the transparent vibration plate and the transparent fixing plate. For example, refer to Japanese Patent Laid-Open No. Hei 10 (1998)-191496 (pp. 3-5, FIG. 1).

Moreover, there is a technology for generating a sound by the following configuration. Between glass substrates constituting a liquid crystal cell, on a glass substrate located on a backside of a screen, a silicon thin film where electrons which transmit image and audio signals can move at high speed is coated, and on the same silicon thin film, a circuit for displaying an image and an audio circuit are arranged. Then, an electric signal is transmitted to a sound source element (exciting source element) attached onto the glass substrate, and the glass substrate located on a front side of the screen is vibrated, and thus the sound is generated. For example, refer to the Internet <URL:HYPERLINK"http://www.asahi.com/tech/asahinews/OSK2003091" http://www.asahi.com/tech/asahinews/OSK2003091 90044.html>.

In such modes of outputting the audio from the screen itself, for example, in a case of using such modes for a cellular phone, a sound source portion of the cellular phone becomes larger as compared with that of a conventional cellular phone. Accordingly, it becomes possible to reproduce a high-quality audio, and audio quality of a ring tone and a conversation can be enhanced. Moreover, in the case of browsing a moving picture, for which use of a third generation cellular phone is expected to be expanded, it also becomes possible to reproduce a realistic sound while displaying an image. Also with regard to a structure of the cellular phone itself, a speaker for listening to a voice of a party on the other end becomes unnecessary, and a speaker for reproducing the ring tone also becomes unnecessary, thus making it possible to further progress the downsizing/thinning and the weight reduction of the device.

However, in externally attaching the electrostatic transparent speaker onto the liquid crystal screen as in the technology described in the above-mentioned Patent reference, an image is seen through the transparent speaker because the transparent speaker is attached onto the front of the screen. Accordingly, there is a disadvantage in that harmful effects such as a decrease in the light quantity of the image and a difficulty in seeing the image due to reflection.

In an alternative technology, between the glass substrates constituting the liquid crystal cell, the glass substrate itself located on the front side of the screen is vibrated to generate the sound. Accordingly, the technology has an advantage for a user in that the disadvantages of the difficulty in seeing the image and the like are extremely small.

Although it is desirable to form the glass substrates constituting the liquid crystal cell as thin as possible in order to achieve the downsizing/thinning and weight reduction of the liquid crystal display device, defective regions of glass of the glass substrates are decorated and substrate surfaces are prone to be uneven when the glass substrates are thinly formed. The unevenness of the surfaces of the glass substrates brings an image display failure in the liquid crystal display device, and accordingly, a thickness of each of the glass substrates sandwiching the liquid crystal layer therebetween, which is obtained by processing the glass substrates to be thin, has had a lower limit of approximately 0.6 to 0.7 mm. Therefore, weights of the glass substrates themselves cannot be reduced sufficiently, and it is difficult to vibrate the entire glass substrate sufficiently, and thus there is a problem that a sufficient volume cannot be ensured.

BRIEF SUMMARY OF THE INVENTION

The present invention has been provided in order to solve such technical problems as described above. It is an object of the present invention to provide a liquid crystal display device capable of outputting a sound of a sufficiently large volume by use of a liquid crystal cell displaying an image.

It is another object of the present invention to maintain the strength of a glass substrate in the liquid crystal cell capable of outputting a sound.

It is another object of the present invention to suppress occurrence of an image defect in the liquid crystal display device capable of outputting a sound of a large volume.

On the basis of such objectives, a liquid crystal display device of the present invention comprises: a thin front transparent substrate having an outer surface in which a rib is formed on a peripheral portion; a back transparent substrate arranged with a predetermined gap from an inner surface of the front transparent substrate, in which liquid crystal is sealed in the gap; and a sound source element provided in contact with the front transparent substrate. Specifically, in the thin front transparent substrate, a configuration is adopted in which at least the rib is formed on the peripheral portion of the outer surface and the sound source element is provided in contact with the front transparent substrate.

The liquid crystal display device can be characterized in that in the front transparent substrate, a region inside the rib is formed to have a thickness of 0.05 to 0.4 mm. Furthermore, a configuration can also be adopted in which the front transparent substrate is glass, and a metal oxide glass film having a refractive index equivalent to a refractive index of the front transparent substrate is coated on a region inside the rib of the outer surface.

In the front transparent substrate, there can further be adopted a configuration in which the rib is formed on an entire region of the peripheral portion of the rib, a configuration in which the rib is formed on a partial region of the peripheral portion, and a configuration in which the plurality of ribs are independently formed on top and bottom and/or left and right of the liquid crystal cell and the plurality of sound source elements are provided on the ribs.

The liquid crystal display device can also be characterized in that the sound source element is provided on a side face of the rib. Furthermore, when the present invention is grasped as a liquid crystal cell, the liquid crystal cell of the present invention comprises: a front transparent substrate; a back transparent substrate arranged with a predetermined gap from the front transparent substrate, in which liquid crystal is sealed in the gap; and a sound source element provided in contact with the front transparent substrate. The liquid crystal cell is characterized in that the front transparent substrate has an attenuation factor of vibration intensity of 32% or less. Here, the attenuation factor of the vibration intensity refers to an attenuation ratio of a detected vibration intensity to an outputted vibration intensity at a time vibrations outputted from one side pass through the front transparent substrate and are detected on the other side.

In such a configuration, the liquid crystal cell can be characterized in that the front transparent substrate includes an inner surface opposite to the back transparent substrate, and an outer surface in which a rib is formed in a peripheral portion.

Furthermore, a liquid crystal cell of the present invention comprises: a front glass substrate; and a back glass substrate arranged with a predetermined gap from the front glass substrate, in which liquid crystal is sealed in the gap. The liquid crystal cell is characterized in that the front glass substrate includes a planar portion with a thickness of 0.05 to 0.4 mm, and a rib formed on a periphery of the planar portion.

Here, a configuration can be adopted, in which in the front glass substrate, an outer surface of the planar portion is coated with a metal oxide glass film having a refractive index equivalent to a refractive index of the front glass substrate. In particular, the liquid crystal cell can be characterized in that a difference between the refractive index of the front glass substrate and the refractive index of the metal oxide glass film is 0.02 or less. Moreover, the liquid crystal cell can be characterized in that the metal oxide glass film is one formed by a hydrolysis reaction of a metal alkoxide composition applied on the planar portion. Furthermore, the liquid crystal cell can also be characterized in that a thickness of the metal oxide glass film is 5 to 20 μm.

The front glass substrate can be formed by a chemical technique such as chemical etching using hydrofluoric acid, for example. Furthermore, a configuration can also be adopted in which in the front glass substrate, the rib has a slant surface toward the planar portion. Moreover, the liquid crystal cell can also be characterized in that the front and back glass substrates are coupled to each other on a region where the rib is formed.

Moreover, when the present invention is grasped as a transparent substrate, the transparent substrate of the present invention is one which is for use in a liquid crystal cell, and sandwiches and seals liquid crystal in cooperation with another transparent substrate. The transparent substrate comprises: a planar portion with a thickness of 0.05 to 0.4 mm; and a rib formed on a periphery of the planar portion.

Here, the transparent substrate can be characterized in that the planar portion has an attenuation factor of vibration intensity of 32% or less. Moreover, the planar portion and the rib can be formed by a chemical technique.

Furthermore, the present invention provides a method of manufacturing a liquid crystal cell, the method of manufacturing a liquid crystal cell of the present invention comprises: a pasting step of pasting together front and back glass substrates such that a predetermined gap is provided therebetween; a sealing step of sealing liquid crystal in the gap between the pasted front and back glass substrates; a masking step of masking at least a peripheral portion of an outer surface of the front glass substrate; and an etching treatment step of performing an etching treatment for the pasted front and back glass substrates after the masking step.

Here, the masking step can include masking of either a peripheral portion of an outer surface of the back glass substrate or an entire surface of the outer surface thereof. Moreover, the method can further comprise a metal oxide glass film forming step of coating an etched surface of the front glass substrate and/or an etched surface of the back glass substrate with metal oxide glass films, each having a refractive index equivalent to either of the refractive indices of the front and back glass substrates. Furthermore, the method can be characterized in that in the etching treatment step, surfaces to be etched of the front glass substrate and/or the back glass substrate are etched to a thickness of 0.05 to 0.4 mm.

As a result of the present invention, it becomes possible, in the liquid crystal cell device, to output a sound of a sufficiently large volume by use of the liquid crystal cell displaying an image.

DETAILED DESCRIPTION OF THE INVENTION

An embodiment of the present invention is described below in detail with reference to the accompanying drawings.

Figure 1:
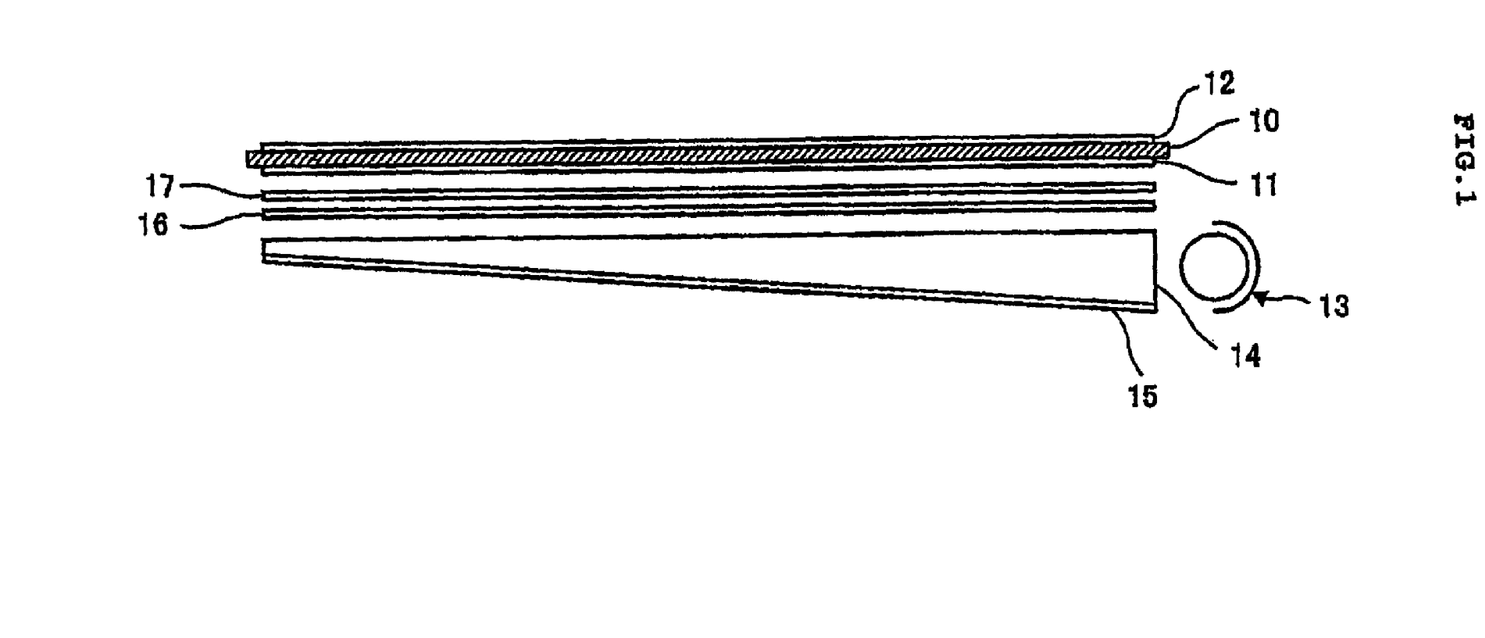
FIG. 1 is a cross-sectional view showing a liquid crystal display device to which this embodiment is applied.

FIG. 1 is a cross-sectional view showing a liquid crystal display device to which this embodiment is applied. Principal portions of the liquid crystal display device shown in FIG. 1 are composed of a liquid crystal cell 10 which modulates a polarization state of a linear polarization incident thereonto; a polarizing plate 11 provided on a light incident side of the liquid crystal cell 10; a polarizing plate 12 provided on a light emitting side of the liquid crystal cell 10; a backlight 13 which is disposed on a side portion on a backside of the liquid crystal cell 10 and irradiates light onto the liquid crystal cell 10; a light guide member 14 which guides the light from the backlight 13 to an entire surface of the liquid crystal cell 10; a prism sheet 16 which enhances brightness of the light reflected off the light guide member 14 in a front direction; and a diffusion plate 17 which makes the light incident evenly onto the liquid crystal cell 10, the light having been emitted from the light guide member 14 and then passing through the prism sheet 16.

In such a liquid crystal display device, the light incident onto the light guide member 14 from the backlight 13 disposed on an end portion of the light guide member 14 is emitted from a surface of the light guide member 14, the surface being on a liquid crystal cell 10 side, while being reflected off a reflecting plate 15 formed on a lower surface of the light guide member 14, and the brightness of the light reflected in the front direction is enhanced by the prism sheet 16. Thereafter, the liquid crystal cell 10 is evenly irradiated by the diffusion plate 17.

With regard to the light incident onto the liquid crystal cell 10, only a specific polarization component (for example, a P-polarization component) passes through the polarizing plate 11, and the other polarization component (for example, an S-polarization component) is cut and converted into a linear polarization. A linear polarization state of the light which has been converted into the linear polarization by the polarizing plate 11 is modulated by the liquid crystal cell 10. Then, only a specific polarization component (for example, the S-polarization component) passes through the polarizing plate 12 disposed in a cross-nicol state with the polarizing plate 11, and the other polarization component (for example, the P-polarization component) is cut. In such a way, ON/OFF of the light is performed for each pixel, and the light is outputted as an image.

Figure 2:
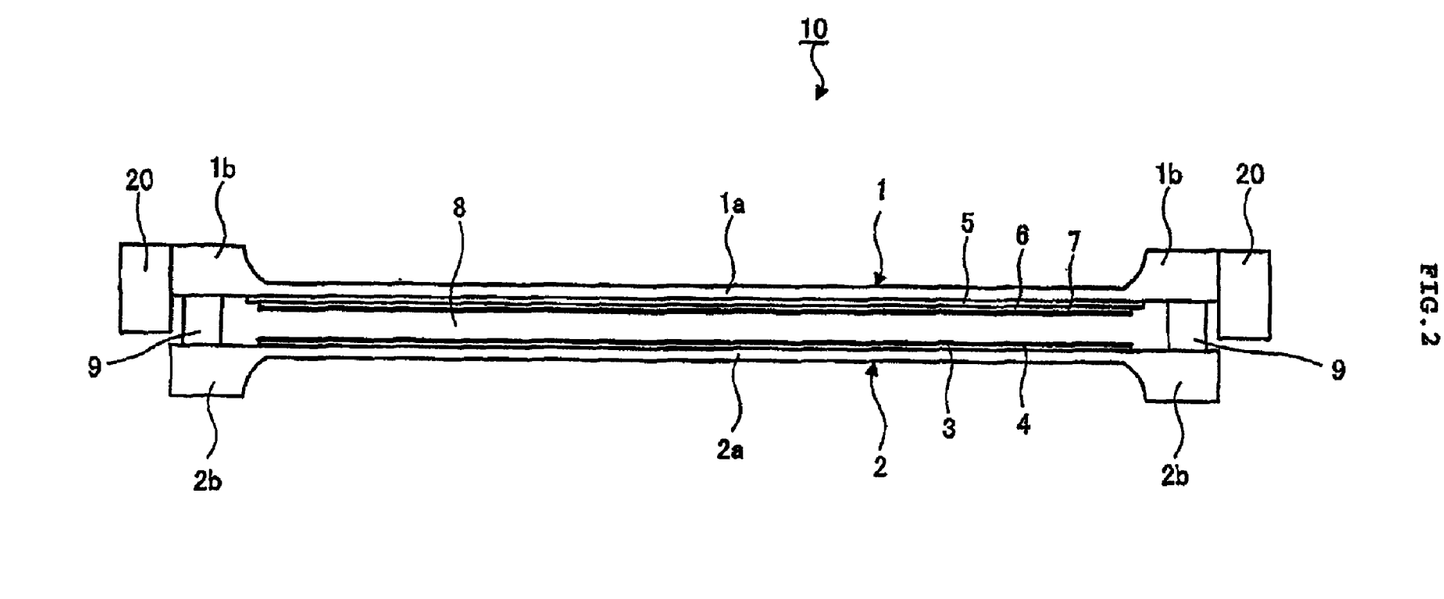
FIG. 2 is a cross-sectional view showing a configuration of a liquid crystal cell.

Next, the liquid crystal cell 10 is described. FIG. 2 is a cross-sectional view showing a configuration of the liquid crystal cell 10. As shown in FIG. 2, the liquid crystal cell 10 is composed of a front glass substrate 1, a back glass substrate 2, a TFT array layer 3, an alignment film 4, a color filter layer 5, a common electrode layer 6, an alignment film 7, and a liquid crystal layer 8.

The front glass substrate 1 serves as a front transparent substrate, the back glass substrate 2 serves as a back transparent substrate, and both of the glass substrates 1 and 2 are arranged in parallel to each other with a predetermined gap therebetween. The TFT array layer 3 and the alignment film 4 are formed on the back glass substrate 2. In the TFT array layer 3, thin film transistors (TFTs), display electrodes, and storage capacitors are formed. The alignment film 4 is formed on the TFT array 3. Moreover, the color filter layer 5, the common electrode layer 6 and the alignment film 7 are formed on the front glass substrate 1. In the color filter layer 5, color filters are formed. In the common electrode layer 6, common electrodes are formed. The alignment film 7 is formed on the common electrode layer 6.

Furthermore, the liquid crystal layer 8 is formed between the front and back glass substrates 1 and 2. Then, the front and back glass substrates 1 and 2 are pasted together by use of a sealing layer 9 such that a surface on which the TFT array layer 3 is formed and a surface on which the common electrode layer 6 and the color filter layer 5 are formed are opposed to each other.

Moreover, on a side face of the front glass substrate 1, a sound source element 20 which vibrates the front glass substrate 1 to generate a sound is disposed.

Figure 3:
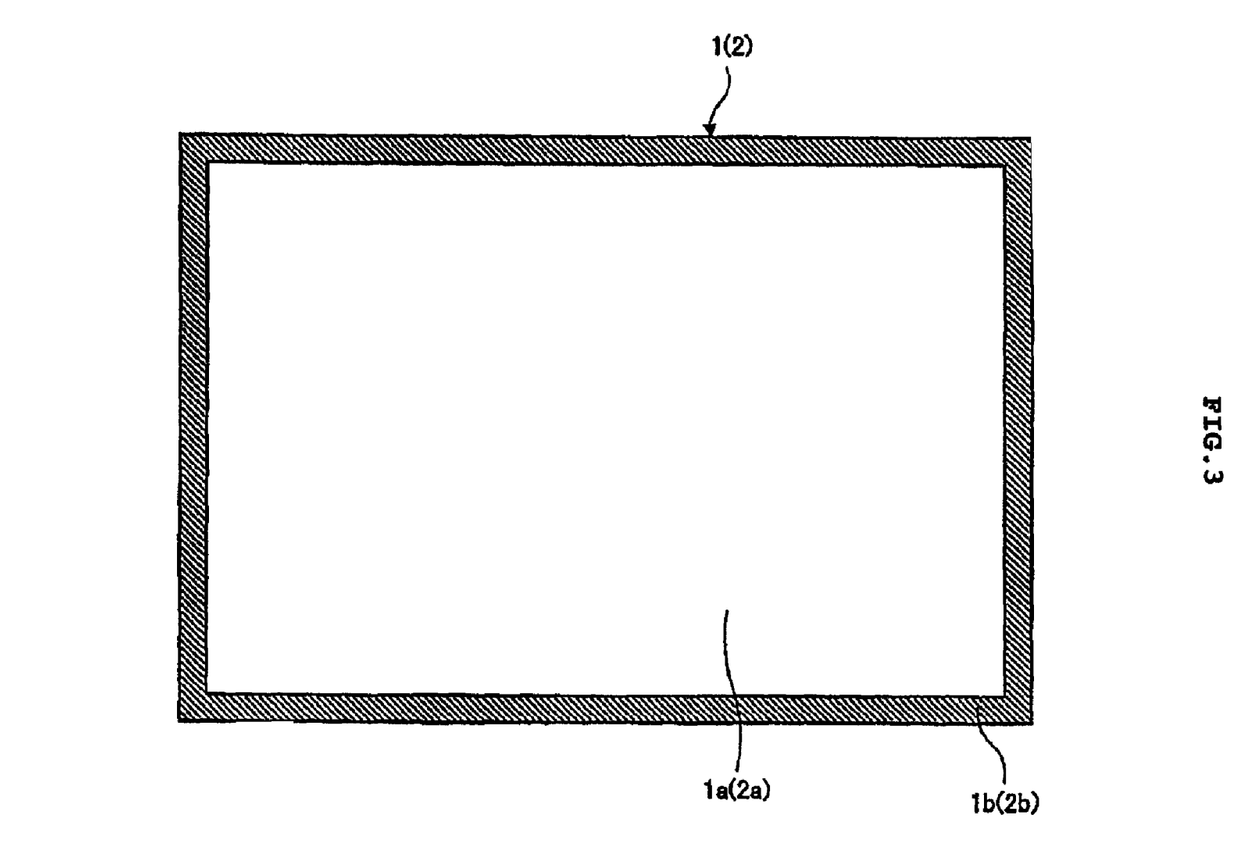
FIG. 3 is a plan view of a front and back glass substrate.

FIG. 3 is a plan view of the front and back glass substrates 1 and 2. The front and back glass substrates 1 and 2 are formed similarly to each other. As shown in FIGS. 2 and 3, the front glass substrate 1 (back glass substrate 2) is a flat plate with dimensions of 36 mm×46 mm, and is composed of a planar portion 1a (2a) which serves as an image display region of the liquid crystal display device, and a rib 1b (2b) formed on a peripheral portion (edge portion) surrounding the planar portion 1a (2a) on one side surface thereof. The planar portion 1a (2a) is formed to have a thickness of approximately 0.1 mm, and the rib 1b (2b) is formed to have a width of 1.5 mm and a thickness of 0.7 mm.

Note that glass for use in the front and back glass substrates 1 and 2 is not particularly limited as long as the glass is one which forms an inorganic glass layer. For example, soda lime glass, single plate glass, curved glass, tempered glass, laminated glass, double glass, glass for a mirror, and the like are mentioned. Usually, one which has a refractive index of 1.48 to 1.52 is used.

The front and back glass substrates 1 and 2 are pasted together such that the surfaces on which the rib 1b and the rib 2b are formed face to the outside individually. Moreover, in the front glass substrate 1 which serves as the front of the liquid crystal display device, on the side face thereof, that is, on a side face of the rib 1b, the sound source elements 20 are provided (refer to FIG. 2). Then, the liquid crystal cell 10 is configured such that, when an audio signal is inputted to the sound source elements 20 from an unillustrated audio circuit, vibrations from the sound source elements 20 are propagated to the front glass substrate 1, and the front glass substrate 1 serves as a vibration plate, thus outputting a sound.

In this case, in the liquid crystal display device of this embodiment, the planar portion 1a of the front glass substrate 1 of the liquid crystal cell 10 is formed to have a thickness of approximately 0.1 mm, and accordingly, the entire region of the planar portion 1a can be vibrated at a large amplitude by the vibrations from the sound source elements 20. Specifically, the planar portion 1a is thinly formed, and thus a weight of the planar portion 1a which serves as the vibration plate is reduced, and accordingly, it becomes possible to vibrate the planar portion 1a largely even under the same vibration energy condition. Therefore, a sound of a large volume can be obtained.

Figure 4:
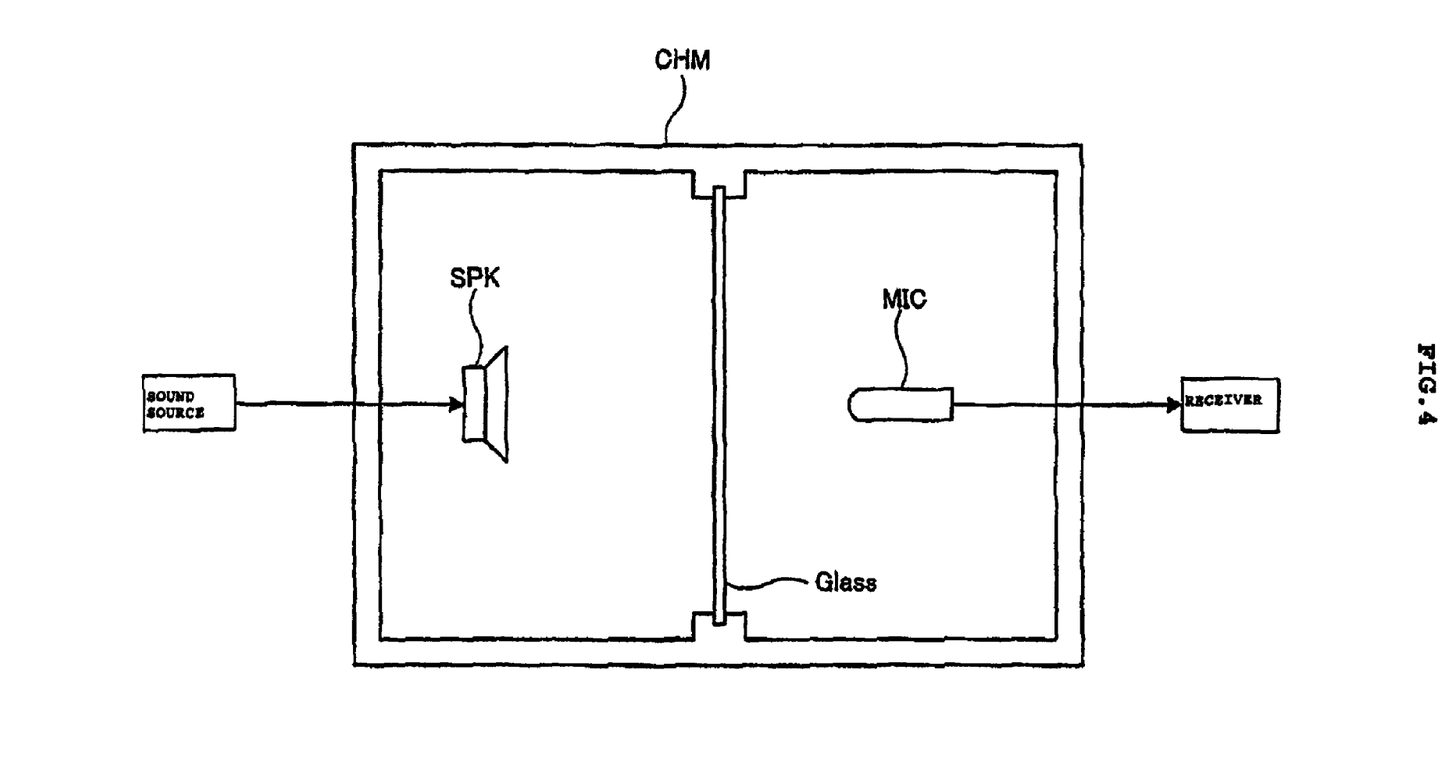
FIG. 4 is a view showing a configuration of a measuring instrument which measures relationships between thicknesses of glass substrates and intensities of vibration propagations.

The relationships between the thicknesses of glass substrates and intensities of vibration propagations are now described. FIG. 4 is a view showing a configuration of a measuring instrument which measures the relationships between the thicknesses of the glass substrates and the intensities of the vibration propagations. In the measuring instrument shown in FIG. 4, two spaces are formed in a chamber (CHM) with a glass substrate (Glass) interposed therebetween, a speaker (SPK) is disposed in one space, and a microphone (MIC) is disposed in the other space. Then, standard sounds with frequencies of 1 kHz and 5 kHz are applied to the speaker (SPK) from a sound source, intensities of the vibrations outputted from the microphone (MIC) through the glass substrates (Glass) different in thickness from one another are received by a receiver, and the intensities of the vibration propagations are compared with one another.

Figure 5:
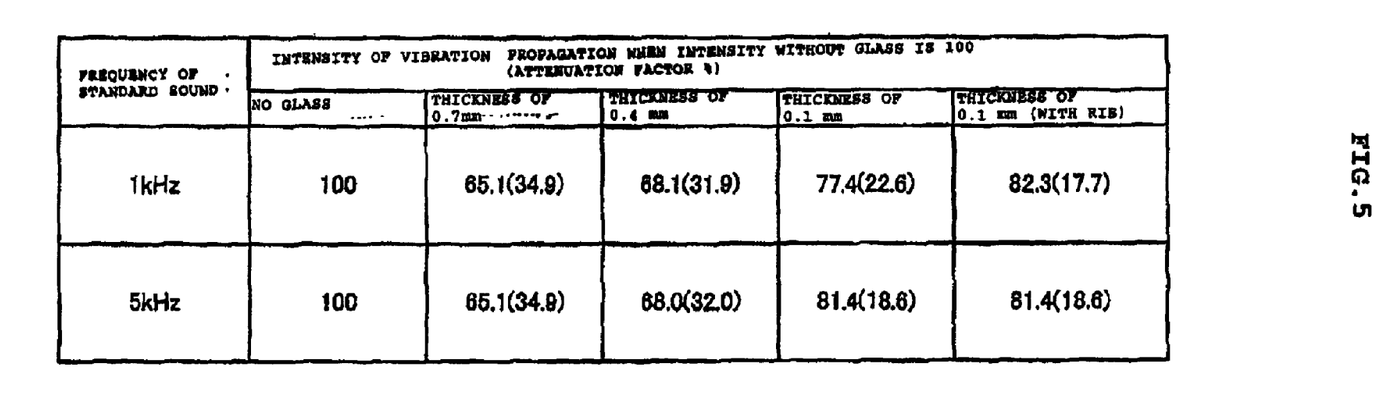
FIG. 5 is a table showing the relationships between the thicknesses of the glass substrates and the intensities of the vibration propagations.

Referring to FIG. 5 there is shown results of the above-described measurements. In FIG. 5, intensities of vibrations in a case of receiving the vibrations directly from the speaker (SPK) without allowing them to pass through the glass substrate (Glass) (a setting state where the glass substrate is not present) are individually defined as 100. Then, relative values of the intensities of the vibrations (intensities of vibration propagations) at the time the glass substrates (Glass) different from one another in thickness are interposed between the two spaces are displayed.

As shown in FIG. 5, in the glass substrate with a thickness of 0.7 mm, attenuation of approximately 35% occurs in both of the cases where the frequencies of the standard sounds are 1 kHz and 5 kHz. As opposed to this, in the glass substrate with a thickness of 0.4 mm, the attenuation factors are improved to approximately 32% in both of the frequencies of 1 kHz and 5 kHz. Moreover, when the thickness of the glass substrate is set at 0.1 mm, the attenuation factors can be improved to approximately 18 to 22%. Moreover, a rib is formed on an edge portion of each glass substrate in addition to the setting of the thickness of the glass substrate at 0.1 mm, and thus a further effect of improving the attenuation factors has been seen.

As described above, from the results shown in FIG. 5, it has been shown that, in the liquid crystal display device of this embodiment, the attenuation of the intensities of the vibration propagations can be reduced by thinning the plate thickness of the front glass substrate 1 which serves as the front to 0.4 mm or less. In terms of manufacturing, it is 0.05 mm or more at which a glass substrate with an even thickness can be realized stably. Hence, use of the front glass substrate 1 formed to have a thickness of as thin as 0.05 to 0.4 mm while taking such a viewpoint into consideration enables a sound of a large volume to be outputted from the liquid crystal cell 10.

When each of the glass substrates (the front and back glass substrates 1 and 2) constituting the liquid crystal cell 10 is formed to have a thickness of as thin as approximately 0.05 to 0.4 mm, strength of the glass substrate becomes decreased. As opposed to this, in the liquid crystal display device of this embodiment, the rib 1b (2b) is formed so as to surround the planar portion 1a (2a) which serves as the image display region, and accordingly, the strength of the glass substrate can be maintained. Therefore, flexure of the glass substrate during handling is reduced, thus making it possible to prevent occurrence of breakage thereof, and to suppress occurrence of the fracture thereof due to vibrations during transportation.

Moreover, occurrence of fracture in the glass substrate, which may be caused by flexure due to a flow velocity of an etchant in an etching treatment step in a manufacturing process to be described later, can also be restricted.

When the thickness of the planar portion 1a of the front glass substrate 1 is thinned, a Young's modulus thereof becomes increased, and accordingly, a sound velocity (transmission velocity of the sound) tends to be decreased. However, the rib 1b is formed around the periphery of the planar portion 1a. Accordingly, tension can be given to the planar portion 1a by the rib 1b, thus also making it possible to restrict the decrease in sound velocity. Therefore, clearness of the sound can be maintained.

Further, in order to output the audio by use of the liquid crystal cell 10, it is necessary to dispose the sound source element 20 on the front glass substrate 1 which serves as the front of the liquid crystal display device. However, in order to obtain a sound of a large volume, it is necessary to constitute the front glass substrate 1 such that the thickness thereof is thinned as described above. For this, in the liquid crystal display device of this embodiment, the rib 1b is formed on the edge portion of the front glass substrate 1, thus making it possible to constitute an area of the side face of the edge portion to be large. Accordingly, it becomes possible to provide the sound source element 20 on the side face of the edge portion of the front glass substrate 1. Therefore, even if the sound source element 20 is provided for the liquid crystal cell 10, the liquid crystal cell 10 will not be formed to be thick, and the downsizing/thinning of the liquid crystal display device is not hindered.

Figure 6:
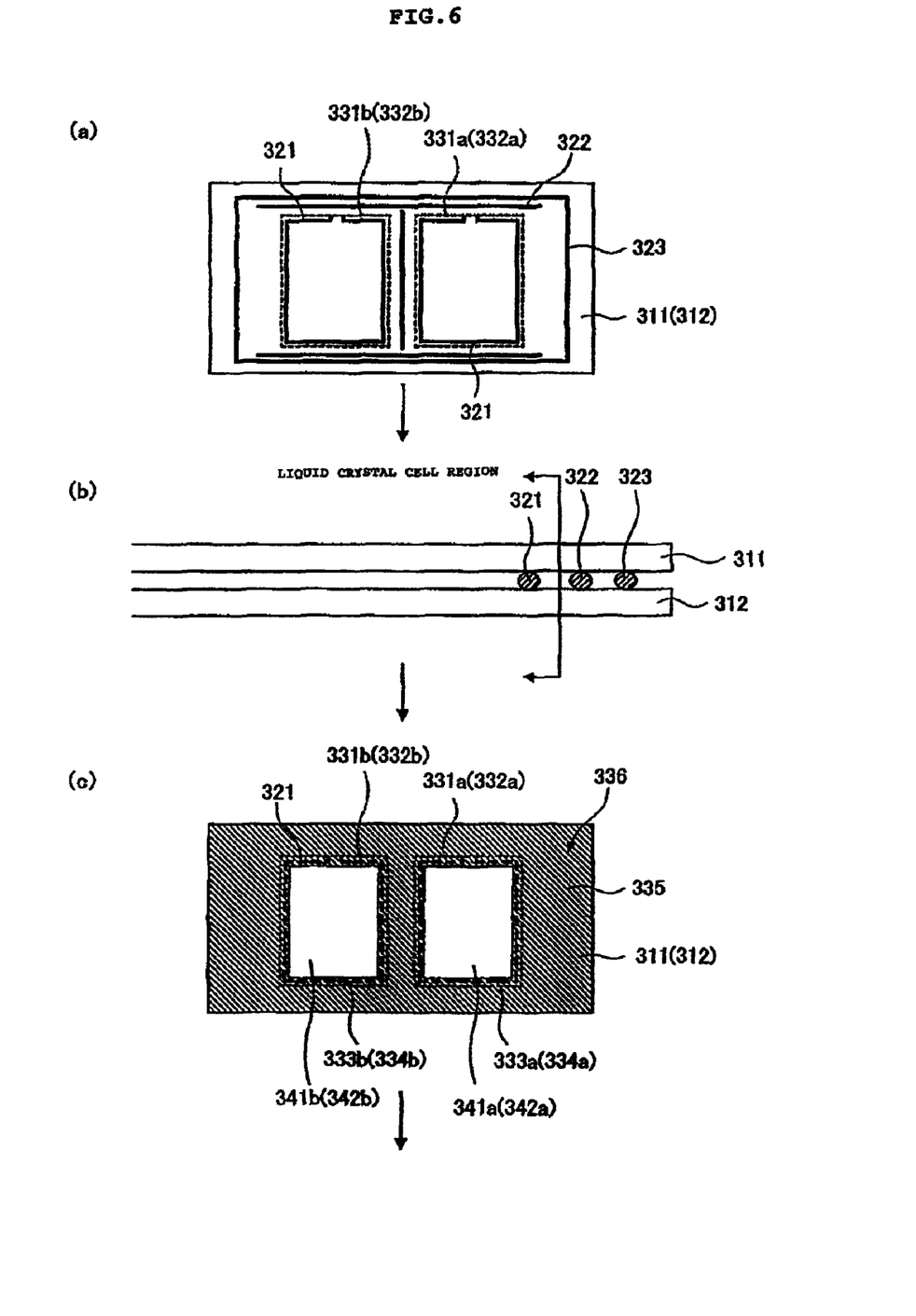
FIGS. 6(a) to 6(c) are views for explaining a method of manufacturing a liquid crystal cell.
Figure 7:
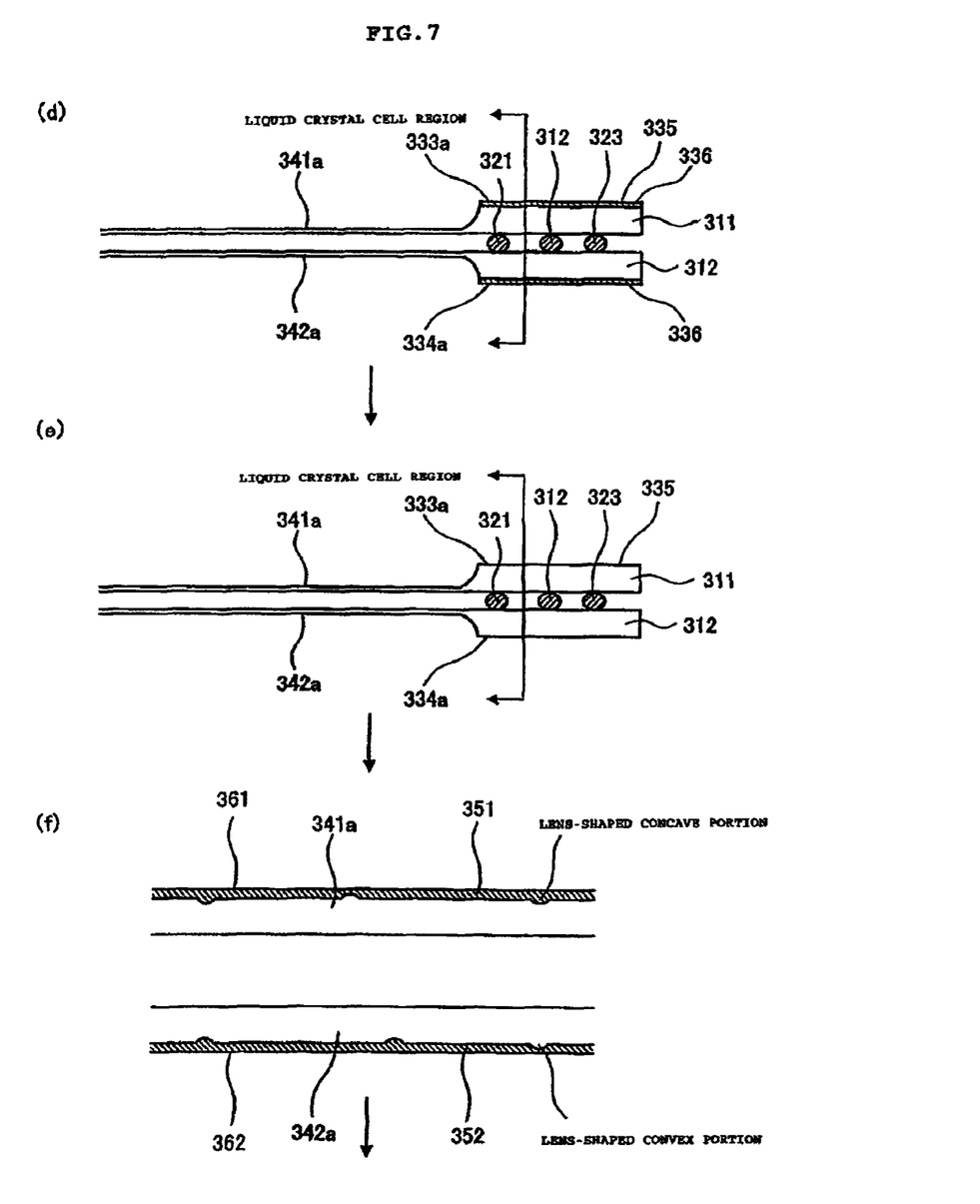
FIGS. 7(d) to 7(f) are views for explaining a method of manufacturing a liquid crystal cell.

Next, a method of manufacturing the liquid crystal cell 10 of this embodiment is described. FIGS. 6(a) to 8(g) are views for explaining the method of manufacturing the liquid crystal cell 10. First, as shown in FIG. 6(a), in order to simultaneously form a plurality of liquid crystal cells 10, two mother glass substrates 311 and 312 for the front and back glass substrates 1 and 2 are prepared.

The thicknesses of the mother glass substrates 311 and 312 are 0.7 mm. Then, on the respective mother glass substrates 311 and 312, a plurality of liquid crystal cell regions 331a and 331b which serve as front glass substrates 1, and the regions 332a and 332b which serve as back glass substrates 2 are set. Moreover, in the mother glass substrate 311 for the front glass substrates 1, on each of the individual liquid crystal cell regions 331a and 331b, the color filter layer 5 and the common electrode layer 6, and further, the alignment film 7, are arranged. Furthermore, in the mother glass substrate 312 for the back glass substrates 2, on each of the individual liquid crystal cell regions 332a and 332b, the TFT array layer 3 and the alignment film 4 are arranged.

(Pasting Step)

Then, to the mother glass substrate 311, a sealant for pasting together the front and back glass substrates 1 and 2 such that a predetermined gap is provided therebetween is applied. In order to form regions where liquid crystal is to be sealed by use of the sealant formed of an epoxy resin adhesive by means of a dispenser, by printing, or the like, main seals 321 are applied to insides of the edge portions of the liquid crystal cell regions 331a and 331b in parallel to the edge portions concerned. Moreover, auxiliary seals 322 for preventing foreign objects from mixing into the liquid crystal cell regions 331a (332a) and 331b (332b) are applied. Furthermore, a doubly-applied seal 323 is applied so as to entirely surround the plurality of liquid crystal cell regions 331a (332a) and 331b (332b).

Subsequently, as shown in FIG. 6(b), the mother glass substrates 311 and 312 are pasted together. In this case, both of the mother glass substrates 311 and 312 are arranged opposite to each other such that the individual liquid crystal cell regions 331a and 331b of the mother glass substrate 311 and the individual liquid crystal cell regions 332a and 332b of the mother glass substrate 312 are aligned with each other. Then, both of the mother glass substrates 311 and 312 are entirely evenly pressurized, and thus are pasted together. Subsequently, the main seals 321, the auxiliary seals 322 and the doubly-applied seal 323 are cured by heating and ultraviolet radiation.

(Sealing Step)

Next, a liquid crystal composition is injected into predetermined gaps in regions (regions inside the applied main seals 321) between the pasted mother glass substrates 311 and 312, where the liquid crystal is to be sealed. Then, liquid crystal injection holes in which the sealant for the main seals 321 is not applied are sealed by ultraviolet curing resin or the like, and thus the liquid crystal composition is sealed in the regions where the liquid crystal is to be sealed, which are formed between the mother glass substrates 311 and 312. (Masking step)

After the sealing step, as shown in FIG. 6(c), on both outer surfaces of the pasted mother glass substrates 311 and 312, a masking treatment for forming coating films 336 by a material having hydrofluoric acid resistant characteristics is performed for predetermined-width regions 333a (334a) and 333b (334b) inside the edges of the liquid crystal cell regions 331a (332a) and 331b (332b) and a region 335 other than the liquid crystal cell regions. In this case, the width regions 333a (334a) and 333b (334b) are set so as to include portions where the main seals 321 are arranged.

Here, as the material resistant to the hydrofluoric acid, for example, polyethylene, vinylidene fluoride and the like can be used. Moreover, as a method of forming the coating films 336, a method of pasting a sheet on which an adhesive tape is pasted and a method of painting paint can be used. However, since it is necessary to remove the coating films 336 in a later step, the adopting of an adhering method capable of peeling off the coating films 336 is needed. (Etching treatment step)

Subsequently, an etching treatment is performed for both outer surfaces of the pasted mother glass substrates 311 and 312. For the etching treatment, ordinary etching methods for glass such as a wet etching method using an etchant and a dry etching method using etching gas can be used. Particularly, a wet etching method using an etchant such as a hydrofluoric acid solution, hydrofluorosilicic acid, and further, one obtained by adding an oxidizer to these, is suitable.

By performing this etching treatment, as shown in FIG. 7(d), the regions on both outer surfaces of the mother glass substrates 311 and 312, where the masking treatment is not performed, that is, the regions (liquid crystal cell surfaces) 341a and 342a (341b and 342b) which are inside the liquid crystal cell regions 331a and 332a (331b and 332b) and exclude the predetermined-width regions 333a and 334a (333b and 334b) inside the edges of the liquid crystal cell regions are etched to be thin to a thickness of approximately 0.1 mm. Specifically, in this etching treatment, the etching is performed until an etching depth reaches 0.6 mm by prolonging an immersion time. (Masking film removing step)

After the etching treatment is performed, the coating films 336 formed on both outer surfaces of the mother glass substrates 311 and 312 are removed. The regions on which the coating films 336 are formed are not etched. Accordingly, in the individual liquid crystal cell regions 331a and 331b of the mother glass substrate 311 and the individual liquid crystal cell regions 332a and 332b of the mother glass substrate 312, as shown in FIG. 7(e), the thicknesses of the predetermined-width regions 333a and 334a (333b and 334b) inside the edges of the liquid crystal cell regions are maintained at 0.7 mm which is an original thickness of mother glass substrates 311 and 312, and liquid crystal cell surfaces 341a and 342a (341b and 342b) inside such width regions are etched to the thickness of 0.1 mm. In this way, each liquid crystal cell region is formed into a shape of a step. (Metal oxide glass film forming step)

Subsequently, as shown in FIG. 7(f), on the liquid crystal cell surfaces 341a and 342a (341b and 342b) etched to the thickness of 0.1 mm, a solution of a metal alkoxide composition containing organic polysiloxane as a main component is applied to an appropriate thickness (usually, 20 µm or less) by an applying method such as brush coating, spray coating, roller coating and spin coating. After the application, the solution of the metal alkoxide composition is subjected to a hydrolysis reaction at 80 degree C. or less for several minutes to several hours, and thus is cured. In such a way, metal oxide glass films 351 and 352 are formed. On surfaces of the metal oxide glass films 351 and 352 containing the organic polysiloxane as a main component, which are thus formed, mirror surfaces 361 and 362 with surface roughness (Ra: arithmetic average roughness) of 0.05 µm or less are formed.

The metal oxide glass films 351 and 352 are now described. The metal oxide glass films 351 and 352 are light transmission coating films made of an organic/inorganic hybrid material formed three-dimensionally cross linked by a sol-gel reaction caused by the hydrolysis reaction of the metal alkoxide composition. For the metal alkoxide composition, for example, a curable composition containing the organic polysiloxane as a main component is mentioned. As specific components of the composition, (a) organic polysiloxane having methyl groups or phenyl groups, (b) organic siloxane having hydroxyl groups or hydrolysis functional groups, and (c) a curing agent are mentioned.

As the (a) organic polysiloxane having methyl groups or phenyl groups, for example, liquid organic polysiloxane having methyl groups or phenyl groups and alkoxy groups of which carbon number is 1 to 4 is mentioned. As such an alkoxy group of which carbon number is 1 to 4, a methoxy group, an ethoxy group, a propoxy group, a butoxy group and the like are mentioned.

Moreover, as such a hydrolysis group in the (b) organic siloxane having the hydroxyl groups or the hydrolysis functional groups, for example, an alkoxy group, an acyloxy group, a ketoxime group, an amide group, an alkenyloxy group and halogen atoms are illustrated. Moreover, the organic siloxane as the (b) component sometimes has monovalent organic groups or hydrogen atoms. As such a monovalent organic group, for example, illustrated are: an alkyl group such as methyl, ethyl, propyl, butyl and hexyl; an alkenyl group such as vinyl and allyl; an aryl group such as phenyl, tolyl and xylyl; an aralkyl group such as phenethyl and β-phenylpropyl; an aminoalkyl group such as N-(β-aminoethyl)-γ-aminopropyl; a group containing an epoxy group, such as γ-glycidoxypropyl and 3,4-epoxycyclohexyl; a group containing a (meta)acryl group, such as γ-methacryloxypropyl; a mercaptoalkyl group such as γ-mercaptopropyl; a cyanoalkyl group such as cyanoethyl; a chloroalkyl group such as β-chloroethyl and γ-chloroethyl; a fluoroalkyl group such as 3,3,3-trifluoropropyl; and the like. Note that, in the (b) component, a partial hydrolysate of alkoxy (liquid silicone resin) is sometimes contained according to needs.

Furthermore, as the (c) curing agent, usually, a curing catalyst for use in a condensation-curing silicone composition is used. As specific examples of the curing agent, mentioned are: organic amine such as triethanolamine; carboxylic acid metal salt such as octylic acid tin and octylic acid zinc; an organic tin compound such as dibutyltin dilaurate and dibutyltin dioctoate; titanate such as tetrabutyl titanate and tetrapropyl titanate; a quaternary ammonium compound such as quaternary ammonium carboxylate; and an amine-based silane coupling agent such as γ-aminopropyltriethoxysilane and N-(β-aminoethyl)-γ-aminopropyltrimethoxysilane. Moreover, an organic aluminum compound or boron halide can be used. Among them, an organic tin compound or boron halide is preferable. These curing agents can be used in combination of two or more thereof.

The metal alkoxide composition to be used for forming the metal oxide glass films 351 and 352 is usually used by being prepared as a solution formed by diluting the composition concerned with an appropriate solvent. Concerning a solvent used for preparing the solution of the composition, such a solvent is not particularly limited as long as the solvent can dissolve and disperse the (a) component, the (b) component and the (c) component. For the solvent, examples are: alcohols such as methanol, ethanol and isopropanol; ether alcohols and ethers such as ethylene glycol monomethyl ether, ethylene glycol monoethyl ether, tetrahydrofuran and dioxane; ketones such as acetone, methyl ethyl ketone and diethyl ketone; esters such as methyl acetate, ethyl acetate and n-butyl acetate; aliphatic hydrocarbon such as n-hexane, gasoline, a rubber solvent, a mineral spirit and kerosene; and the like.

In order to form the metal oxide glass films 351 and 352, the above-described solution of the metal alkoxide composition is applied on the liquid crystal cell surfaces 341*a* and 342*a* (341*b* and 342*b*) to an appropriate thickness (usually, 20 μm or less) by the applying method such as brush coating, spray coating, roller coating and spin coating. After the application, the solution of the metal alkoxide composition is subjected to the hydrolysis reaction at 80 degree C. or less for several minutes to several hours, and thus is cured. In such a way, sol-gel layers are formed. The metal oxide glass films 351 and 352 formed of sol-gel layers containing the organic polysiloxane as a main component, which are thus formed, are light transmission transparent coating layers, which have a hardness of, for example, approximately 9H, and are brought into intimate contact with the liquid crystal cell surfaces 341*a* and 342*a* (341*b* and 342*b*) and coated thereon.

The liquid crystal cell surfaces 341*a* and 342*a* (341*b* and 342*b*) are etched to be thin to the thickness of approximately 0.1 mm by prolonging the immersion time in the etching treatment step. Accordingly, defects are decorated on the liquid crystal cell surfaces 341*a* and 342*a* (341*b* and 342*b*), and lens-shaped convex portions and/or lens-shaped concave portions with a size of approximately 100 to 200 μm occur, causing an image failure in the displayed image. However, the solution of the metal alkoxide composition, which is to be used for forming the metal oxide glass films 351 and 352, has an appropriate viscosity (for example, 9 to 12 s/IHS), and is subjected to the hydrolysis reaction at a relatively low temperature of 80 degree C. or less, and an appropriate time is required for curing the solution. Therefore, it becomes possible to sufficiently ensure a time necessary for the solution of the metal alkoxide composition applied on the liquid crystal cell surfaces 341*a* and 342*a* (341*b* and 342*b*) to spread evenly and cure. As a result, mirror surfaces high in smoothness can be formed.

As described above, the liquid crystal cell surfaces 341*a* and 342*a* (341*b* and 342*b*) on which the lens-shaped convex portions occur due to the etching treatment are smoothed by the metal oxide glass films 351 and 352 which are glass pseudo films, and light scattering at interfaces between the liquid crystal cell surfaces 341*a* and 342*a* (341*b* and 342*b*) and the metal oxide glass films 351 and 352 is suppressed. As a result, occurrence of the image failure in the displayed image due to the lens-shaped convex and concave portions caused by the decorated defects on the surfaces of the liquid crystal cell surfaces 341*a* and 342*a* (341*b* and 342*b*) can be suppressed.

Furthermore, the surfaces 361 and 362 of the metal oxide glass films 351 and 352 are formed into the mirror surfaces with the surface roughness (Ra) of 0.05 μm or less. Accordingly, light transmittance of the surfaces 361 and 362 can be recovered to approximately 100%. Moreover, the glass pseudo films as described above supplement physical strength of the liquid crystal cell surfaces 341*a* and 342*a* (341*b* and 342*b*). The glass pseudo films exhibit high hardness, toughness and surface adhesiveness. The glass pseudo films also have a property as light transmission coating films, in which a reinforcement effect and an optical compensation effect are demonstrated.

Note that the thicknesses (D) of the metal oxide glass films 351 and 352 are selected as appropriate according to magnitudes of scratches and unevenness of the surfaces of the liquid crystal cell surfaces 341*a* and 342*a* (341*b* and 342*b*) after being subjected to the etching treatment, and are not particularly limited. However, usually, the metal oxide glass films 351 and 352 are formed to have a thickness of 5 to 20 μm. Note that the thicknesses of the metal oxide glass films 351 and 352 may be either different from each other or may be the same.

It is necessary for the metal oxide glass films 351 and 352 to have refractive indices equivalent to that of the front glass substrate 1 or the back glass substrate 2. Specifically, for the metal oxide glass films 351 and 352, ones are used, in which a difference in refractive index from the front glass substrate 1 or the back glass substrate 2 is 0.02 or less, and of which refractive indices are 1.48 to 1.52. The metal oxide glass films 351 and 352 as well as the front glass substrate 1 or the back glass substrate 2 have the respective refractive indices equivalent to one another. Thus, the light passing through the liquid crystal cell surfaces 341*a* and 342*a* (341*b* and 342*b*) and the metal oxide glass films 351 and 352 exhibits a behavior similar to the case where the light passes through a two-layer structure in which two pieces of glass having the same refractive index are laminated. It becomes possible to obtain high transparency in which transmittance of light with a wavelength of 380 nm to 780 nm is 95% or more. (Cutting step)

Figure 8:
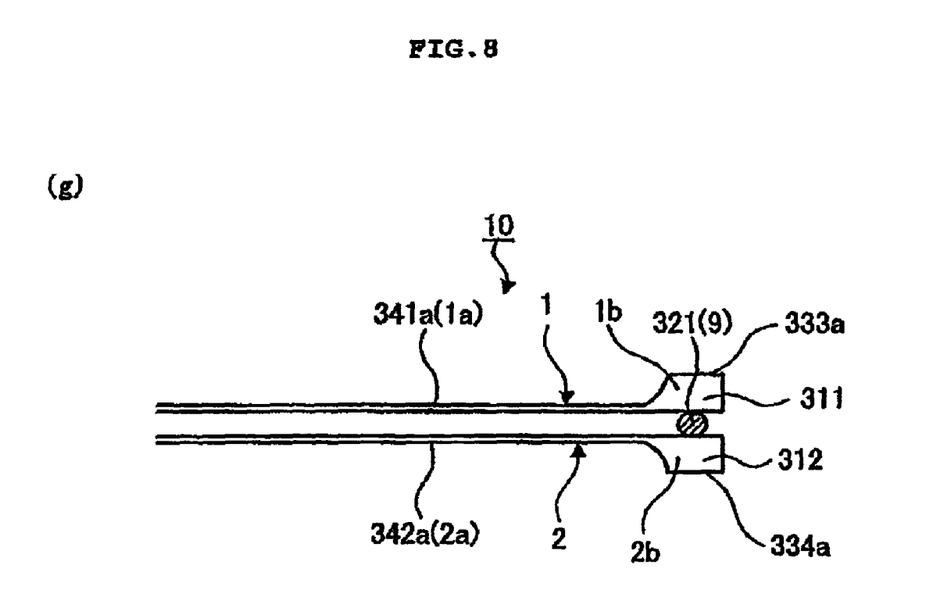
FIG. 8(g) is a view for explaining a method of manufacturing a liquid crystal cell.

Finally, the pasted pair of mother glass substrates 311 and 312 are cut into each of the predetermined liquid crystal cell regions 331*a* (332*a*) and 331*b* (332*b*), and the liquid crystal cells 10 are formed. In each of the liquid crystal cells 10 manufactured according to such a manufacturing method, as shown in FIG. 8(*g*), the ribs 1*b* and 2*b* with the thickness of 0.7 mm are formed on the predetermined-width regions 333*a* (334*a*) and 333*b* (334*b*) inside the edge of the liquid crystal cell 10, and the thin-layered planar portions 1*a* and 2*a* with the thickness of 0.1 mm are formed on the liquid crystal cell surfaces 341*a* (342*a*) and 341*b* (342*b*) inside such ribs (refer also to FIG. 3).

Therefore, the disposition of the sound source element 20 on the side face of the liquid crystal cell 10 makes it possible to output a sound of a large volume when the liquid crystal cell 10 itself is vibrated to generate a sound. Here, the main seal 321 serves as the sealing layer 9 of the liquid crystal cell 10 (refer to FIG. 2).

Note that, in the manufacturing method of this embodiment, the color filter layer 5 and the common electrode layer 6, and further, the alignment film 7, are arranged on each of the liquid crystal cell regions 331*a* and 331*b* of the mother glass substrate 311. The TFT array layer 3 and the alignment film 4 are arranged on each of the liquid crystal cell regions 332*a* and 332*b* of the mother glass substrate 312. Then, both of the mother glass substrates 311 and 312 are pasted together, and the liquid crystal composition is sealed therebetween. Thereafter, the masking step, the etching treatment step, the masking film removing step, the metal oxide glass film forming step, and the cutting step are implemented. However, the following manufacturing order is also possible.

First, the masking step, the etching treatment step, the masking film removing step and the metal oxide glass film forming step are implemented for both of the mother glass substrates 311 and 312. Thereafter, the color filter layer 5 and the common electrode layer 6, and further, the alignment film 7, are arranged on each of the liquid crystal cell regions 331a and 331b of the mother glass substrate 311. Moreover, the TFT array layer 3 and the alignment film 4 are arranged on each of the liquid crystal cell regions 332a and 332b of the mother glass substrate 312. Then, both of the mother glass substrates 311 and 312 are pasted together, and the liquid crystal composition is sealed therebetween. Thereafter, the cutting step is performed. In this case, in the masking step, on one surface of each of the mother glass substrates 311 and 312, the masking treatment is performed for the predetermined-width regions 333a (334a) and 333b (334b) inside the edges of the liquid crystal cell regions 331a (332a) and 331b (332) and the region 335 other than the liquid crystal cell regions. Meanwhile, on the other surface of each of the glass substrates, the masking treatment is performed entirely.

Another manufacturing method can be adopted, in which the masking is performed entirely on the outer surface of the mother glass substrate 312 in the masking step, and the outer surface of the mother glass substrate 312 is not etched in the etching treatment step. Specifically, the back glass substrate 2 can be formed into an even state without any rib as in the mother glass substrate 312.

Figure 9:
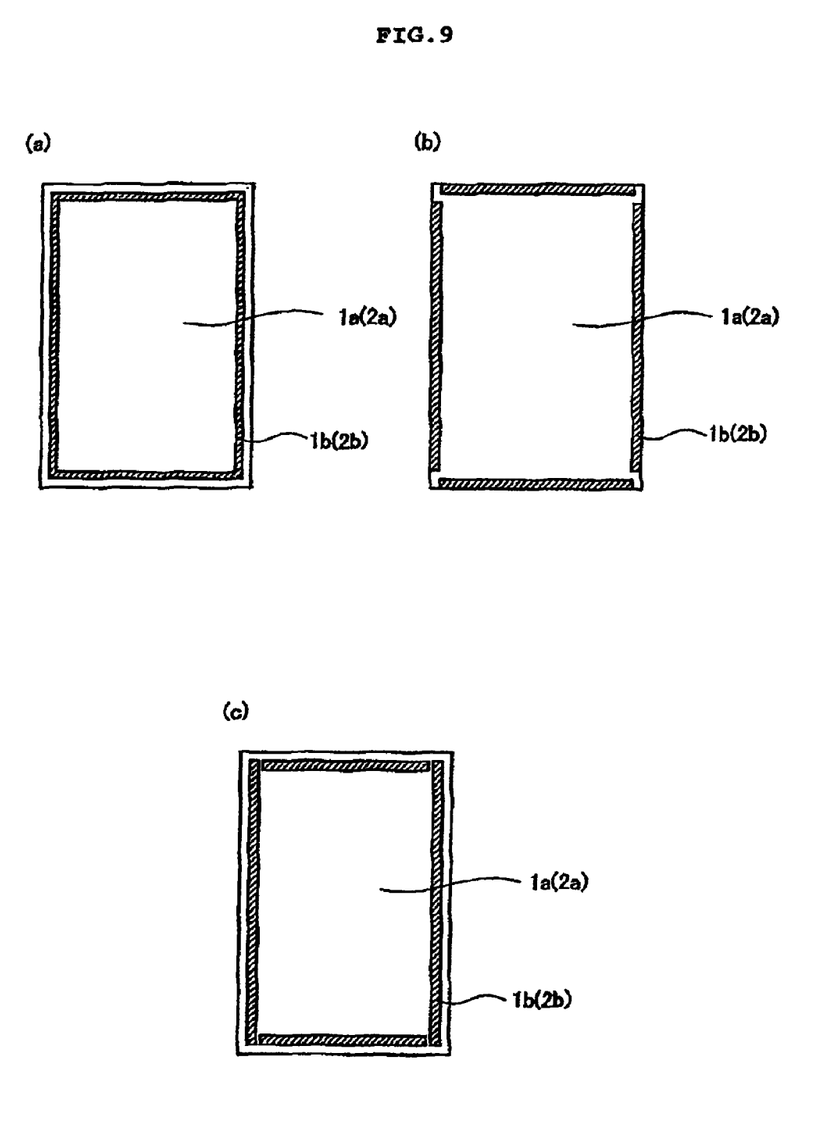
FIGS. 9(a) to 9(c) are views showing arrangement and configuration examples of ribs.
Figure 10:
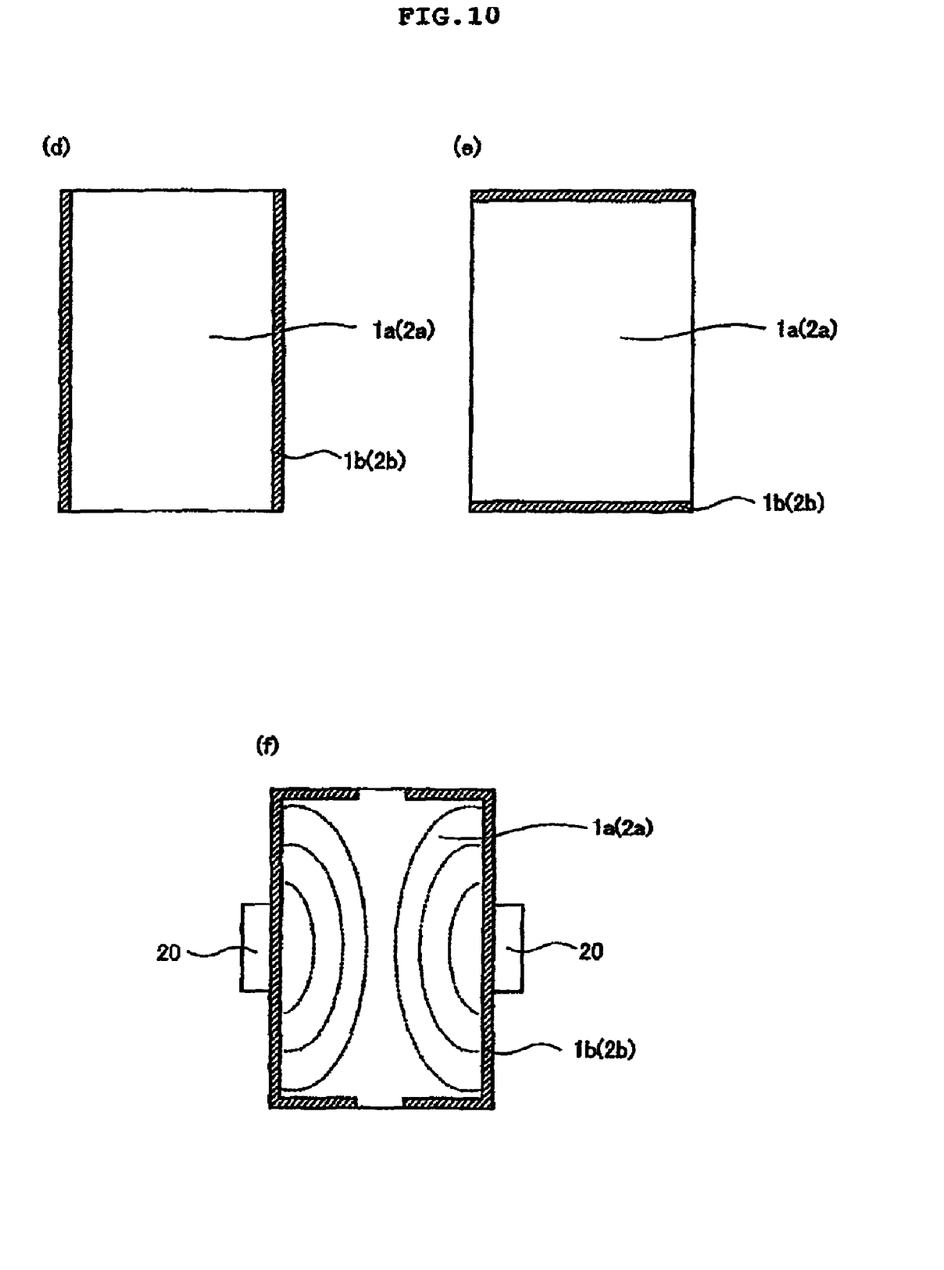
FIGS. 10(d) to 10(f) are views showing arrangement and configuration examples of ribs.

In the liquid crystal display device of this embodiment, in the liquid crystal cell 10, the rib 1b (2b) is formed so as to entirely surround the periphery of the planar portion 1a (2a). However, the arrangement and configuration of the rib 1b (2b) is not limited to this configuration, and as shown in FIGS. 9(a) to 10(f), a variety of forms can be adopted. One in which the rib 1a (2b) is formed inside the edge of the planar portion 1a (2a) as shown in FIG. 9(a) can be used. Ones in which the ribs 1b (2b) are formed with corner portions being left unformed as shown in FIGS. 9(b) and 9(c) can be used. Moreover, ones in which the ribs 1b (2b) are formed only on both left-and-right sides or both top-and-bottom sides as shown in FIGS. 10(d) or 10(e) can also be used.

In particular, as shown in FIG. 10(f), if the rib 2b on which the sound source element 20 is to be provided is separated into two at the center portion and the separated ribs 2 are formed into U shapes independently on the left and right sides, vibrations from the sound source elements 20 arranged on both left and right sides of the liquid crystal cell 10 propagate independently from the left and right ribs 2, thus also making it possible to obtain a stereo effect. In this case, it is satisfactory if the ribs 2 on which the sound source elements 20 are provided are arranged independently on the left and right sides, and the configurations shown in FIGS. 9(b), 9(c) and 10(d) can also be used.

As shown in FIG. 2, it is preferable to adopt a configuration in which the rib 1b (2b) has a slant surface gradually thinned toward the inside (toward the planar portion 1a (2a)). For example, it is preferable to form the inside the rib 1b (2b) into a tapered shape. A portion like a boundary portion between the planar portion 1a (2a) and the rib 1b (2b), in which a thickness is radically changed, has structural characteristics that a stress is prone to concentrate thereon when force is applied thereto from the outside. A breakage is prone to occur in such a boundary portion.

Accordingly, the boundary portion is formed into such a tapered shape which becomes gradually thinned. Thus, the stress due to vibrations, which comes from the rib 2b on which the sound source element 20 is disposed, is suppressed from concentrating on the boundary portion, thus making it possible to disperse such a stress due to vibrations on the entire boundary portion. Therefore, the breakage on the boundary portion between the planar portion 1a (2a) and the rib 1b (2b) can be restricted from occurring.

Furthermore, it is preferable to provide the sealing layer 9 so as to be located in a region sandwiched between the ribs 1b and 2b. Specifically, widths of the ribs 1 and 2 are formed larger than a distance between an end portion edge of the liquid crystal cell 10 and the sealing layer 9. More specifically, the widths of the ribs 1b and 2b are formed to be 1 mm or more because the sealing layer 9 is usually disposed inside from the end portion edge of the liquid crystal cell 10 only by approximately 1 mm.

As described above, the sealing layer 9 is a seal for sealing the liquid crystal composition in the liquid crystal layer 8, and is a binder for pasting together the front and back substrates 1 and 2. Hence, it is desirable to adopt a configuration in which external force is not applied to the portion where the sealing layer 9 is formed as much as possible such that the sealing layer 9 does not peel between the front and back glass substrates 1 and 2.

In the liquid crystal display device of this embodiment, the ribs 1 and 2 are formed thick, and accordingly, even if the sound source element 20 is disposed on the side portion of the rib 2b, the rib 2b is not vibrated at a large amplitude. Accordingly, such large force to peel off the sealing layer 9 is not applied to the interface between the sealing layer 9 and the rib 2b. Therefore, leakage of the liquid crystal composition from the sealing layer 9 and a positional shift between the front glass substrate 1 and the back glass substrate 2 can be restricted from occurring.

Note that, though glass is used as the transparent substrates constituting the liquid crystal cell in the liquid crystal display device of this embodiment, the transparent substrates can also be formed of resin. In this case, it is possible to manufacture, by integral molding, each thin transparent substrate in which the rib is formed on the peripheral portion.

As described above, in the liquid crystal display device of this embodiment, the planar portion 2a of the front glass substrate 1 of the liquid crystal cell 10 which serves as the image display region is formed to the thickness of as thin as approximately 0.05 to 0.4 mm. Accordingly, the entire region of the planar portion 1a can be vibrated at a large amplitude by the vibrations from the sound source element 20 disposed on the side portion of the front glass substrate 1. Therefore, it becomes possible to output a sound of a sufficiently large volume through the liquid crystal cell 10 in addition to an image.

Moreover, the rib 1b (2b) is formed so as to surround the planar portion 1a (2a) which serves as the image display region. Accordingly, the strength of the glass substrate can be maintained, the flexure of the glass substrate during handling is reduced, thus making it possible to prevent the occurrence of breakage thereof, and to suppress the occurrence of fracture thereof due to vibrations during transportation. Furthermore, the occurrence of fracture of the glass substrate, which may be caused by the flexure due to the flow velocity of the etchant in the etching treatment step in the manufacturing process, can also be suppressed. Therefore, it becomes possible to apply the glass substrate formed to the thickness of as thin as approximately 0.05 to 0.4 mm to the liquid crystal display device.

Examples of making use of the present invention include, an application as a display in a liquid crystal television set, a portable information terminal such as a cellular phone and a personal digital assistant (PDA), a car navigation device, and the like.

It will be apparent to those skilled in the art having regard to this disclosure that other modifications of this invention beyond those embodiments specifically described here may be made without departing from the spirit of the invention.

Accordingly, such modifications are considered within the scope of the invention as limited solely by the appended claims.

What is claimed is:

1. A liquid crystal display device, comprising:
a thin front transparent substrate having an outer surface in which a rib is formed on a peripheral portion;
a back transparent substrate arranged with a predetermined gap from an inner surface of the front transparent substrate, in which liquid crystal is sealed in the gap; and
a sound source element provided in contact with a side face of the rib, wherein the sound source element vibrates the front transparent substrate to output sound from only the front transparent substrate, whereby the rib improves an attenuation factor of vibration intensity of the front transparent substrate.

2. The liquid crystal display device according to claim 1, wherein, in the front transparent substrate, a region inside the rib is formed to have a thickness of approximately 0.05 to 0.4 mm.

3. The liquid crystal display device according to claim 1, wherein the front transparent substrate is glass, and a metal oxide glass film having a refractive index equivalent to a refractive index of the front transparent substrate is coated on a region inside the rib of the outer surface.

4. The liquid crystal display device according to claim 1, wherein, in the front transparent substrate, a plurality of ribs are independently formed on top and bottom and/or left and right, and a plurality of sound source elements are provided on side faces of the ribs.

5. A liquid crystal cell, comprising:
a front transparent substrate;
a back transparent substrate arranged with a predetermined gap from the front transparent substrate, in which liquid crystal is sealed in the gap, wherein the front transparent substrate includes an inner surface opposite to the back transparent substrate, and an outer surface in which a rib is formed in a peripheral portion; and
a sound source element provided in contact with a side face of the rib, wherein the sound source element vibrates the front transparent substrate to output sound from only the front transparent substrate, whereby the rib improves an attenuation factor of vibration intensity of the front transparent substrate and wherein the front transparent substrate has an attenuation factor of vibration intensity of approximately 32% or less.

* * * * *